(No Model.)
J. D. RIGGS.
SLITTING MACHINE.
No. 560,231. Patented May 19, 1896.
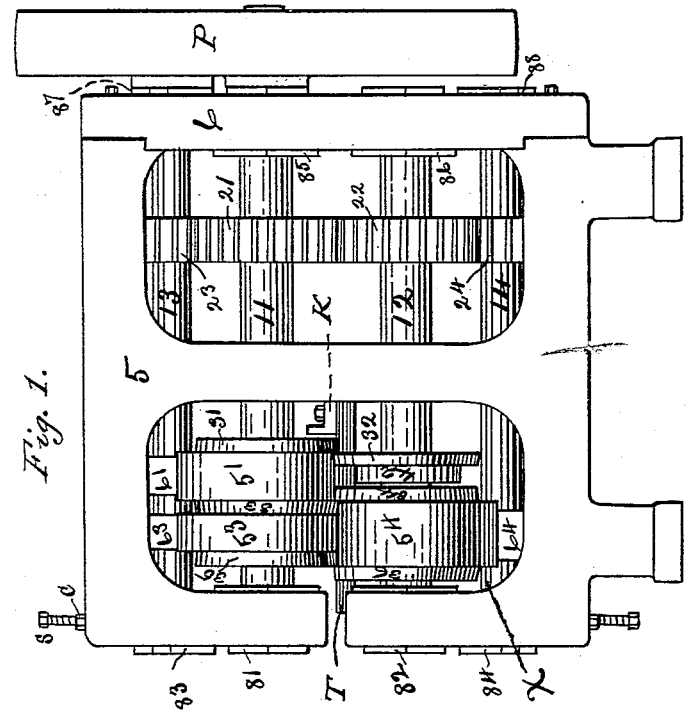
Fig. 1.
Fig. 5.
Fig. 4.
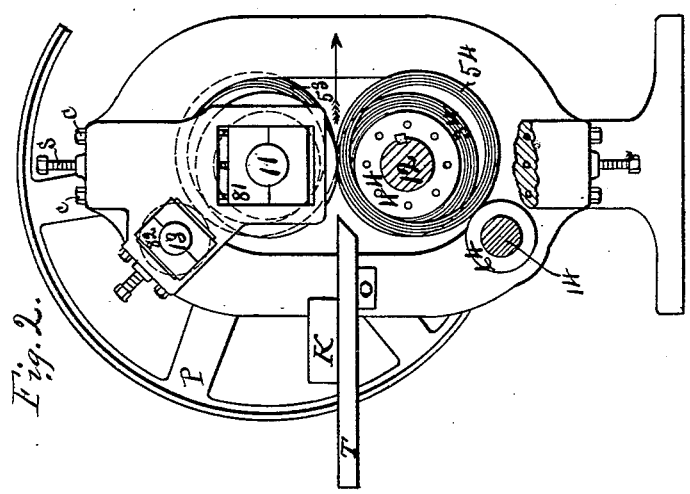
Fig. 2.
Fig. 3.
Witnesses.
Inventor.
John D. Riggs.

UNITED STATES PATENT OFFICE.

JOHN D. RIGGS, OF TOLEDO, OHIO.

SLITTING-MACHINE.

SPECIFICATION forming part of Letters Patent No. 560,231, dated May 19, 1896.

Application filed January 16, 1893. Serial No. 458,592. (No model.)

*To all whom it may concern:*

Be it known that I, JOHN D. RIGGS, a citizen of the United States, residing at Toledo, in the county of Lucas and State of Ohio, have invented certain new and useful Improvements in Slitting-Machines, of which the following, in connection with the accompanying drawings, is a specification.

This invention relates to machines for cutting sheet metal into strips, leaving the "bur" at the edges both on the same side of each strip.

The objects of this invention are to provide improved means for "extracting" or "stripping" the metal strip out from between two adjacent cutters and to feed it along through the machine.

In the accompanying drawings similar letters and figures of reference refer to similar parts in the different views.

Figure 1 is a side elevation of a machine embodying my improvements. Fig. 2 is an end elevation of the same with a portion broken away at the line X of Fig. 1. Fig. 3 is an enlarged cross-section of a strip of metal as cut on this machine, showing the sharp or "burred" corners and the rounded corners. Fig. 4 is a cross-section of a strip formed into shape suitable for dash-molding for buggies and for binding for maps, curtains, &c. Fig. 5 is a cross-section of a tube formed from one of these strips before being soldered or brazed together.

The machine consists of a suitable frame 5, with a portion 6 made separate and bolted on, of four shafts 11 12 13 14 with suitable bearings in said frame, four gears 21 22 23 24 connecting said shafts, a driving-pulley P, a set of cutters 31 32 33 34 35 36 attached to hubs or collars 41 42 43 44, suitable eccentric stripping and feeding rings 51 53 54, stripping-ring collars 61 63 64, a feed-table T and guide K.

The frame 5 6 is arranged to support eight bearings or journals 81 82 83 84 85 86 87 88 for the four shafts. These bearings are each made in halves. The upper half of bearing 81, Fig. 2, is held down by the screw s, and the lower half is held up by the two screws c c, which pass loosely through the upper part and are threaded into the lower part, thus providing adjustment up and down for the bearing. The other bearings are constructed in a similar manner. The inner ends of the bearings have flanges fitting against the frame 5 6, and the shafts are made smaller at the bearings, leaving a shoulder to prevent any end motion of the shafts.

The cutter 32 is secured to the hub 42 by suitable screws, and the hub is keyed to the shaft. The other cutters are secured to their respective hubs in the same way. A stripping-ring 54 fills the space between cutters 34 and 36, as shown in Fig. 1. Its inside diameter is greater than the outside diameter of the hub 44, as shown in Fig. 2. This stripping-ring is not fastened to any part of the machine, but is confined to a position eccentric to the shaft 12 by the collar 64 and the ring 53 and is in continual contact with the hub 44 at one place. Cutters 34 and 36 prevent longitudinal displacement of said stripping-ring 54. The stripping-ring 53 fills the space between cutters 33 and 35 and is held in eccentric position by collar 63, ring 54, and hub 43.

Stripping-ring 51 is arranged differently from rings 53 and 54, and is adapted to the cutting of narrower strips than is possible by the other arrangement. Ring 51 runs between cutters 31 and 33, surrounds the hub 41, and is held in eccentric position by collar 61, hub 41, and the cutters 32 and 34, ring 51 serving to strip the metal from between cutters 31 and 33, and ring 51, in combination with cutters 32 and 34, acting as feeding-rolls to draw the strip through the machine.

In shearing sheet metal it is well known that one corner is burred or left quite sharp and square, while the other is left smooth and slightly rounded. For many purposes it is desirable to have the burred corners at the two edges of a strip toward the same side, as shown in Fig. 3. When both edges are cut at once and the cutters so arranged that the rounded corners are toward the same side, the strips are crowded in between two adjacent cutters and require to be extracted or "stripped" out from between the cutters. It has been customary to use a stationary piece fastened so as to project through between the cutters, and thus "strip" the metal out from between the cutters. Those stationary strippers offer a resistance to the metal passing through the machine, and it is found to be necessary to provide extra feeding-rolls when using stationary strippers.

In this machine the eccentric rings serve the double purpose of stripping the metal out from between adjacent cutters and feeding it along through the machine. The eccentric rings roll on the strips and do not scratch a polished surface so badly as stationary strippers sliding over the strips. The eccentric rings are in a better location for feeding short pieces than it is possible to place separate feeding-rolls.

When it is desired to cut different widths of wide sheets on the same machine on different occasions, the hubs may have flanges on one end and a cutter on the other and carry eccentric rings between flange and cutter, leaving an open space on the shafts between hubs, thereby allowing them to be set at various distances apart.

What I claim, and desire to secure by Letters Patent, is—

1. In a rotary sheet-metal-slitting machine an annular ring surrounding one of the cutter-shafts and working eccentric to it in such a manner as to extract the sheet-metal strip out from between the adjacent cutters, substantially as shown and described.

2. In a rotary sheet-metal-slitting machine, a pair of annular rings for each strip cut, working eccentric to and surrounding the cutter-shafts and serving to feed the strip through the machine, one ring of the pair also serving as a stripping-ring, substantially as shown and described.

In testimony that I claim the foregoing I have hereunto affixed my name in the presence of two subscribing witnesses.

JOHN D. RIGGS.

Witnesses:
CARL H. BECKHAM,
J. D. COOK.